US007827713B2

(12) United States Patent
Gleeson et al.

(10) Patent No.: US 7,827,713 B2
(45) Date of Patent: Nov. 9, 2010

(54) CAROUSEL ADVERTISING SYSTEM

(75) Inventors: Michael Gleeson, Salt Lake City, UT (US); Tracy Zwahlen, Draper, UT (US); Zack Clark, Salt Lake City, UT (US)

(73) Assignee: Double Take Marketing, Salt Lake City, UT (US)

( * ) Notice: Subject to any disclaimer, the term of this patent is extended or adjusted under 35 U.S.C. 154(b) by 172 days.

(21) Appl. No.: 12/044,353

(22) Filed: Mar. 7, 2008

(65) Prior Publication Data

US 2008/0221993 A1 Sep. 11, 2008

Related U.S. Application Data

(60) Provisional application No. 60/894,120, filed on Mar. 9, 2007.

(51) Int. Cl.
*G09F 11/12* (2006.01)
(52) U.S. Cl. ........................................................ 40/524
(58) Field of Classification Search ................... 40/472, 40/524, 491; 198/804, 502.1, 850
See application file for complete search history.

(56) References Cited

U.S. PATENT DOCUMENTS

| 5,165,526 | A | * | 11/1992 | Conklin, Jr. | ................. 198/804 |
| 5,209,340 | A | | 5/1993 | Munkner et al. | |
| 5,311,980 | A | * | 5/1994 | Munkner et al. | ......... 198/502.1 |
| 5,330,044 | A | * | 7/1994 | Conklin, Jr. | ............... 198/502.1 |
| 5,869,168 | A | * | 2/1999 | Mahn, Jr. | ................. 428/32.77 |
| 6,044,961 | A | * | 4/2000 | Hine | ....................... 198/502.1 |
| 6,186,314 | B1 | | 2/2001 | Conklin, Jr. | |
| 6,260,693 | B1 | * | 7/2001 | Mohr | ......................... 198/850 |

FOREIGN PATENT DOCUMENTS

WO 03096312 11/2003
WO 2009109851 9/2009

* cited by examiner

*Primary Examiner*—Gary C Hoge
(74) *Attorney, Agent, or Firm*—Kirton & McConkie; Kenneth E. Horton

(57) ABSTRACT

Advertising system that adheres printed indicia to surfaces are described. The advertising system can contain a substrate containing the printed indicia layer and an adhesive layer. A protective layer, formed of a substantially clear or transparent material, can be used protect an exterior surface of the substrate. The printed indicia may be coated, screen printed, transfer laminated, etc., to the underlying surface to which the advertising system is attached, as can the protective layer and the adhesive layer when present. The advertising system can be used on non-durable surfaces, as well as surfaces which are exposed to extreme conditions and/or continuous wear have. The advertising system can also be used with moving and non-moving, vertical and horizontal surfaces. The advertising systems also allow application and removal of advertisements quickly and effectively without removing, mechanically altering, or damaging the surfaces to which they are applied. Other embodiments are described.

25 Claims, 7 Drawing Sheets

CAROUSEL ADVERTISING SYSTEM

CROSS-REFERENCE TO RELATED APPLICATIONS

This patent application claims priority to U.S. Application Ser. No. 60/894,120, filed Mar. 9, 2007, the entire disclosure of which is hereby incorporated by reference.

FIELD

The application relates to advertising systems and methods for advertising. In particular, this application relates to an advertising system that allows high visibility and exposure by utilizing space which has previously gone unused due to durability limitations and/or cost limitations of the advertising signage.

BACKGROUND

High-exposure advertising helps companies ensure that target markets are reached. Such companies are continually seeking new and better ways to reach the consumers for their products and services. Because of vast and continuous amounts of foot traffic and the number of potential consumers, advertising space in airports is premium. Airport management is constantly seeking new mediums to create additional advertising revenue. It is therefore in the best interest of both airport management and advertisers to utilize all available advertising space in airports.

In the past, certain spaces have not been effectively utilized in airports due to practical limitations in the available advertising spaces. At the same time, some spaces are extremely desirable locations for advertising because of the captive audiences they command. One example of such advertising space is the baggage carousel, or the location where travelers can retrieve their luggage. The average traveler will spend many minutes during every airport visit staring at the baggage carousel waiting for luggage. But the baggage carousel has not been traditionally used as advertising space.

SUMMARY

This application describes an advertising system that adheres printed indicia to surfaces. The advertising system can contain a substrate containing the printed indicia layer and an adhesive layer. A protective layer, formed of a substantially clear or transparent material, can be used protect an exterior surface of the substrate. The printed indicia may be coated, screen printed, transfer laminated, etc., to the underlying surface to which the advertising system is attached, as can the protective layer and the adhesive layer when present. The advertising system can be used on non-durable surfaces, as well as surfaces which are exposed to extreme conditions and/or continuous wear have. The advertising system can also be used with moving and non-moving, vertical and horizontal surfaces. The advertising systems also allow application and removal of advertisements quickly and effectively without removing, mechanically altering, or damaging the surfaces to which they are applied.

BRIEF DESCRIPTION OF THE DRAWINGS

The following description can be better understood in light of Figures, in which.

Figure 1:
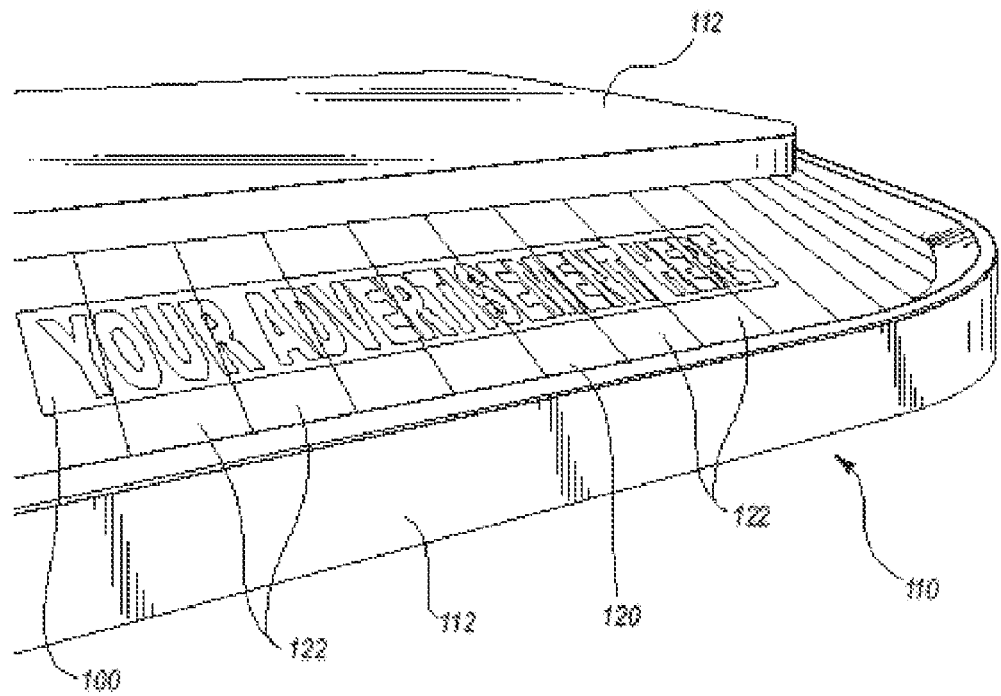
FIG. 1 is a depiction of some embodiments of an advertising system.

Together with the following description, the Figures demonstrate and explain the principles of the advertising system and associated methods for using the systems for advertisement. In the Figures, the thickness and configuration of components may be exaggerated for clarity. The same reference numerals in different Figures represent the same component.

DETAILED DESCRIPTION

The following description supplies specific details in order to provide a thorough understanding of the advertising systems. Nevertheless, the skilled artisan would understand that the advertising systems and associated methods can be implemented and used without employing these specific details. Indeed, the systems and associated methods can be placed into practice by modifying the systems and associated components and methods and can be used in conjunction with any existing apparatus, system, component, and/or technique conventionally used in the industry. For example, while the description below focuses on advertising systems that may be used on an airport baggage carousel, the advertising systems may be adapted and used on other surfaces, including moving walkways, and escalators. As, the advertising systems could be used on apparatus containing moving belts, such as checkout counters and treadmills.

Figure 2:
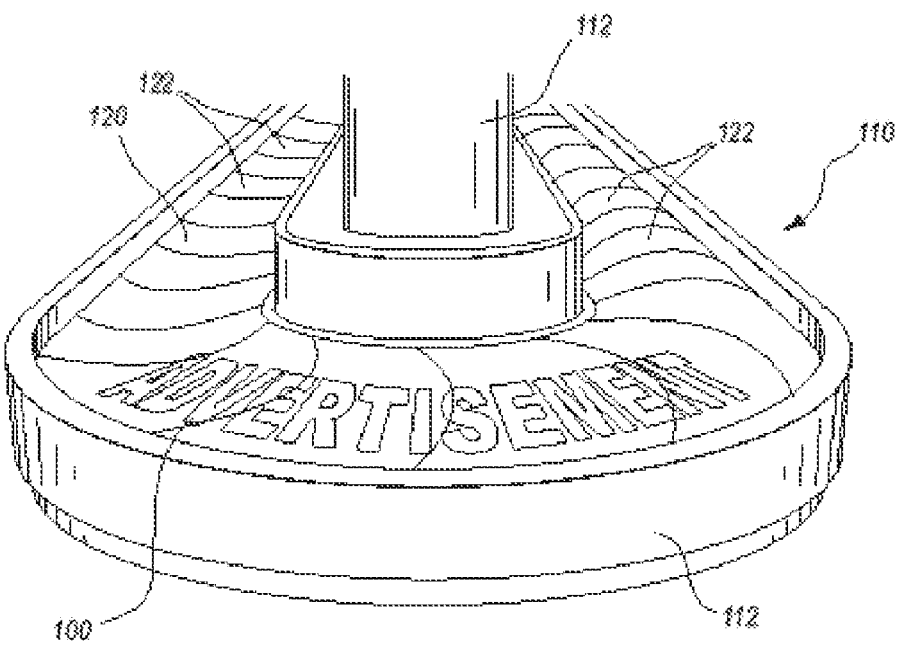
FIG. 2 is a depiction of some embodiments of an advertising system.

FIGS. 1-2 illustrate some embodiments of advertising system 100 to different configurations of baggage carousel 110. Baggage carousel 110 may include frame 112 for support, a supply mechanism (not shown) to deliver baggage to carousel 110, moving table 120, including articulating plates 122 that travel along a fixed path determined by frame 112, and change configurations to allow moving table 120 to allow moving table 120 to follow a desired continuous path, such as a serpentine, circular, oval, etc. In some embodiments, the advertising system 100 may be produced in segments, with each segment being the appropriate size for one of articulating plates 122 of the baggage carousel 110. Each segment may then be applied in sequence to consecutive articulating plates 122 to display one visually continuous image, message, advertisement, etc. In other embodiments, the advertising system 100 may be produced in a single segment that is place on a single articulating plate 122.

The indicia is used at the advertising media. The indicia may be any visual representation, such as advertisement, picture, text, message, drawing, or any other desired visual representation. Examples of the types of indicia that can be used include content-targeted advertisements (targeted to text, pictures, products, etc.), image specific ads, venue specific advertisements, random advertisements, affiliate advertising, demographic specific advertisements, banner advertisements, pictures, holographic images, promotional and discount codes.

FIG. 1 illustrates adverting system 100 located on baggage carousel 110 with articulating plates 122 oriented at an angle such that baggage introduced onto articulating plates 122 slides to the bottom of plates 122 and are held on baggage carousel 110 by the retaining wall of frame 112. Baggage carousel 110 may be an airport or train baggage carousel, or any other similar device having a surface with a moveable, articulated surface such as an escalator, or even a device or apparatus with a movable, continuous surface such as treadmills or a conveyer belt used at a check-out stand in retail locations. In some embodiments, such as those illustrated in FIG. 1, advertising system 100 may allow luggage to slip easily down articulating plates 122 to the retaining wall of frame 112 while creating enough friction to keep baggage moving along with moving table 120. The advertising system 100 may be affixed to articulating plates 122 such that an individual waiting for baggage will be able to see indicia of advertising system 100 as the baggage carousel 110 operates, whether or not luggage is present on the carousel 10.

The advertising system 100 can be also be used on surfaces other than the angled surface illustrated in FIG. 1, including substantially vertical surfaces and substantially horizontal surfaces. An example of the substantially horizontal surface is illustrated in FIG. 2, which shows baggage carousel 110 with flat articulating plates 122 on moving table 120, such that moving table 120 remains substantially horizontal while conveying baggage. In such systems, articulating plates 122 rotate and slide relative to each other as moving table 120 changes directions to form a desired path. Again, the advertising system 100 may be affixed to articulating plates 122 such that indicia of advertising system 100 may be presented to individuals waiting for baggage along baggage carousel 110. The indicia of the advertising system may be designed such that the advertisement is understandable at all times when articulating plates 122 move relative to each other.

The articulating plates 122 may be made of various known materials ranging from stainless steel, plastics, glass, rubber, etc., depending on application requirements and/or machine manufacturer preference. The functional life of articulating plates 122 may be extended by application of the advertising system 100 to the plates since the advertising system can reduce the normal wear and damage to articulating plates that may occur during normal use and due to baggage. Thus, advertising system 100 may reduce maintenance costs, down time, and may prolong the life of articulating plates 122 and baggage carousel 110. And since the advertising system 100 can be selective applied and removed quickly and effectively without removing, mechanically altering, or damaging articulating plates 122, or other portions of baggage carousel 110, it can reduce downtime and maintenance costs of such machines.

Depending on the length of baggage carousel 110, the advertising system 100 may include one or more independent indicia applied to a single baggage carousel 110, giving maximum protection to moving table 120 and articulating plates 122 while giving maximum exposure of the indicia to individuals waiting for baggage. As well, a plurality of indicia on a single baggage carousel 110 may increase advertising revenue by allowing different advertisements or multiple advertisements on a single carousel.

In some embodiments, the advertising system 100 may be used with other moving surfaces, such as moving walkways, escalators, or other similar moving surfaces. Other embodiments may include application of indicia of advertisement system 100 to non-moving portions of baggage carousel 110, such as portions of frame 112 including the walls bordering moving table 120 of baggage carousel 110, moving walkway, escalator, or other moving device. In some embodiments, the advertising system 100 may be produced and applied as a single segment.

Figure 3A:
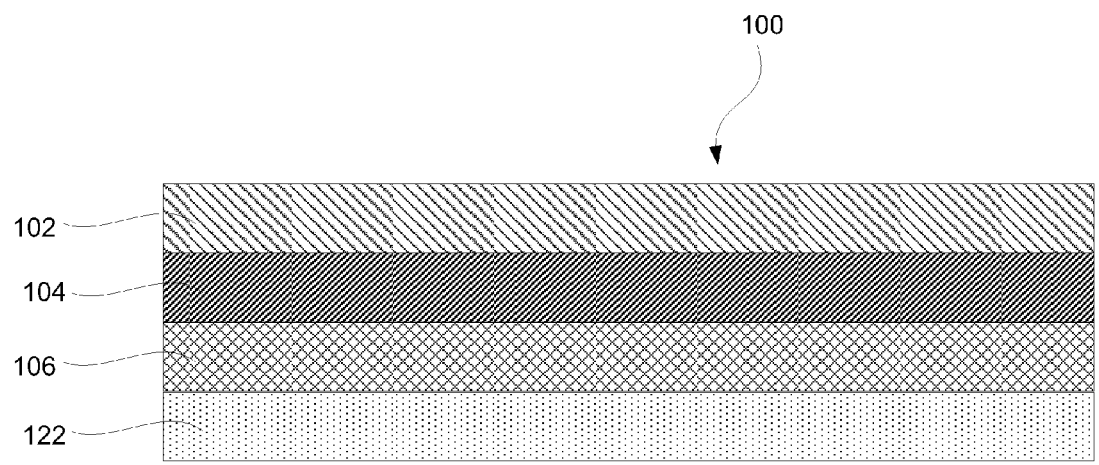
FIGS. 3a, 3b, and 3c are cross-sectional views of some embodiments of an advertising system.

FIG. 3a illustrates a magnified view of a cross-section of some embodiments of the advertising system 100. The advertising system 100 may include several layers, including protective layer 102, indicia layer 104, and adhesive layer 106, and other layers as desired. Protective layer 102 may be made of any material that resists wear, while providing visual access to the indicia of advertising system 100. For example, protective layer 102 may be a polymer coating selected from one or more of fluoropolymers, acrylate polymers, urethane polymers, vinyl polymers, polycarbonate thermoplastic resins, or any combination or copolymers or other similar type of material that provides the desired properties of wear resistance and appearance.

Protective layer 102 may be ultra-violet protective, partially or completely transparent, colored, translucent, etc., or any combination of these properties. In some embodiments, depending on durability requirements, protective layer 102 may be coated with various liquids, such as WD-40 and or similar lubricants such as white silicone, industrial and automotive waxes and polishes, automotive plastic and rubber cleaner and conditioner such as Formula 2001, or spray on Teflon or like substances that provide similar results, and waxes to reduce friction, assist in overall performance, and to resist dirt, oils and markings that may be left by moving baggage or by the motion of articulating plates 122 against each other during operation of baggage carousel 110.

The indicia layer 104 may include the indicia of advertising system 100. Indicia layer 104 may be made of vinyl, paper, polypropylene, canvas, styrene, flexible LCD screens, plastic substrates or any other printable material that can be produced using a large format digital printer, via a silk-screening process, or any other printing process.

Figure 3C:
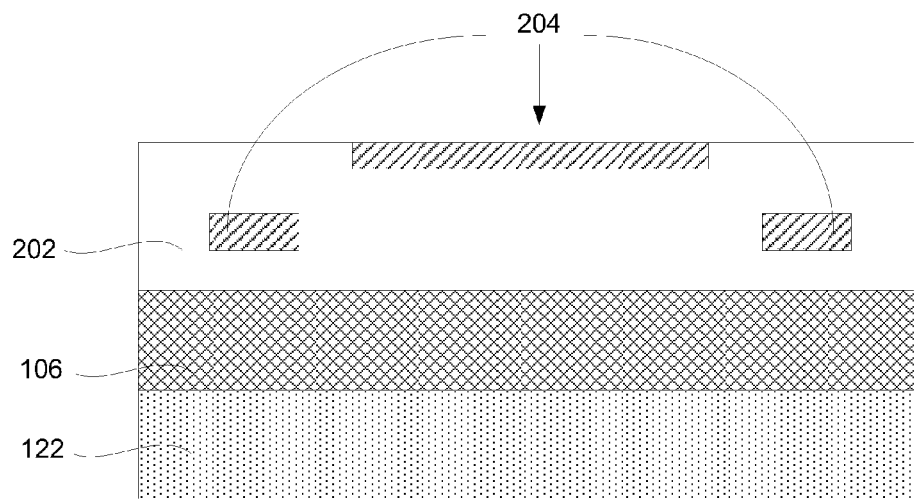
Figure 3B:
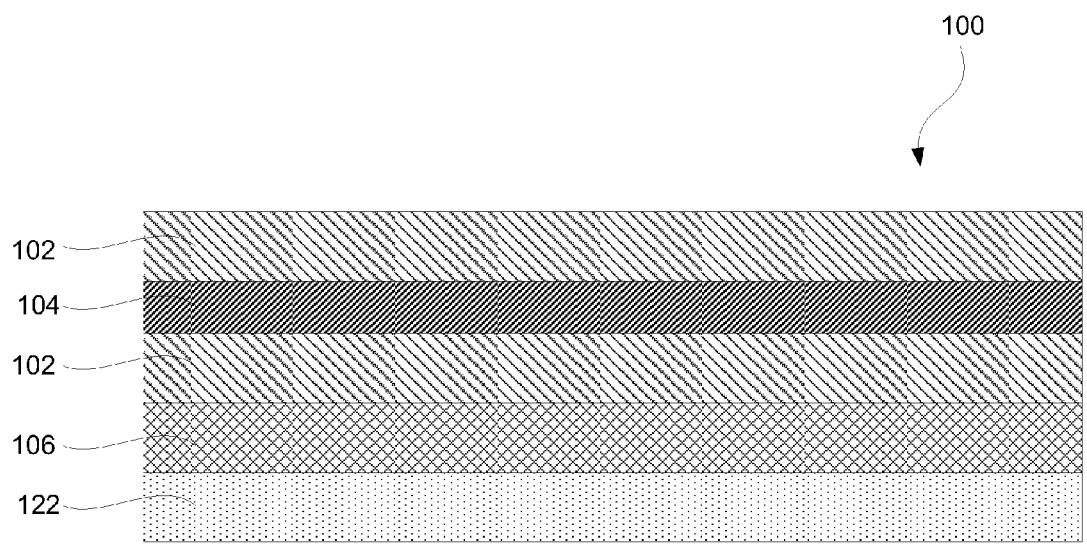

In some embodiments, indicia layer 104 may also be incorporated into the protective layer 102 offering different visual and protective qualities as shown in FIG. 3b. In other embodiments, the protective layer 202 includes the indicia 204, such that a separate indicia layer is not necessary, as shown in FIG. 3c. The indicia layer 104 may be printed indicia or any other visual indicia.

The adhesive layer 106 may be any known adhesive that adheres indicia layer 104 and/or protective layer 102 to the underling surface, i.e., the articulating plate 122. In some embodiments, adhesive layer 106 is made of pressure-sensitive adhesives including copolymers, acrylate esters, and polyolefin-based polymers. In some embodiments, heat or solvent activated adhesives can be utilized in place of the pressure-sensitive adhesive. Depending on the desired application, adhesive layer 106 may provide the function of indicia layer 104, protective layer 102, or both.

In some embodiments, the adhesive layer 106 may allow removal of advertising system 100 without removal or damage to articulating plates 122, or other surface to which it is applied. Similarly, the adhesive layer 106 may sufficiently bond the advertising system 100 to the underlying surface (i.e., the articulating plates) to reduce or eliminate the unintended separation of the advertising system 100 from the articulating plates 122. For example, in some embodiments, adhesive layer 106 may be heat activated for application and removal, otherwise remaining with strong adherence on articulating plates 122.

Figure 4:
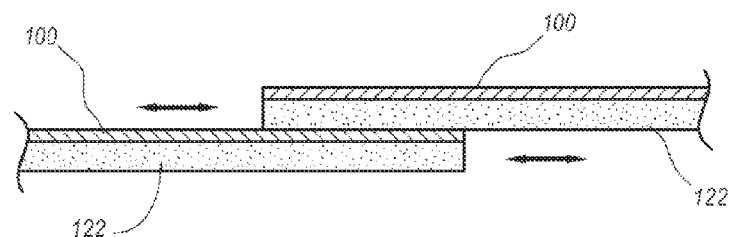
FIG. 4 is a cross-sectional view of some embodiments of an advertising system.

FIG. 4 illustrates a cross-section of some embodiments of advertising system 100 on articulating plates 122. As shown, during operation of the baggage carousel 110, the individual articulating plates 122 of baggage carousel 110 will move relative to one another as moving table 120 moves along its path. The advertising system 100 may provide additional protection against wear of the articulating plates 122 as they move relative to each other during normal operation. FIG. 4 also illustrates that portions of advertising system 100 may be covered—and uncovered—depending on the position of each of articulating plates 122.

The overall dimensions and thicknesses of protective layer 102, indicia layer 104, and adhesive layer 106 may vary, depending upon the dimensions of the surface to which it is to be secured, the desired configuration of the visual image to be imparted, etc. In some embodiments, the thicknesses of these layers can range anywhere from about 0.1 mil to about 1 inch. In other embodiments, the thickness of the protective layer 102 can range from about 2 mil to about 12 mil, the thickness of the indicia layer 104 can range from about 2 mil to about 8 mil, and the thickness of the adhesive layer 106 can range from about 0.25 mil to about 2 mil.

Each layer of advertising system 100 may have a variation of shapes and designs, such as circular, oval, square, irregular, or any other shape. As well, the shape of the protective layer 102, indicia layer 104, and adhesive layer 106 may vary from one layer to the next.

In some embodiments, the advertising system is not limited to using just three layers. In these embodiments, two or four layers (or even more layers) can be used. For example, there can be multiple adhesive layers, multiple indicia layers, and/or multiple protective layers that in some configurations overlap each other. And the specific composition of those layers need not be limited to those described herein. Other types of adhesives, print materials and laminates, including new types of these materials, can be used.

In some embodiments, when portions of articulating plates 122 overlap, the indicia, including the advertising image or message displayed on advertising system 100, may be constructed such that the image or message in the indicia appears in a contracted or modified form. For example, an image may be constructed such that a different message is displayed as advertising system 100 moves to different portions of moving table 120. In some embodiments, the image of advertising system 100 may conceal certain letters when articulating plates 122 move with respect to each other, displaying a different combination of letters and consequently, a different message. In other embodiments, the pictorial or visual image of the indicia may change as various portions of the image are concealed by portions of articulating plates 122, altering the message, or creating a humorous, thoughtful, or otherwise sequential pictorial or visual representation.

Figure 5:
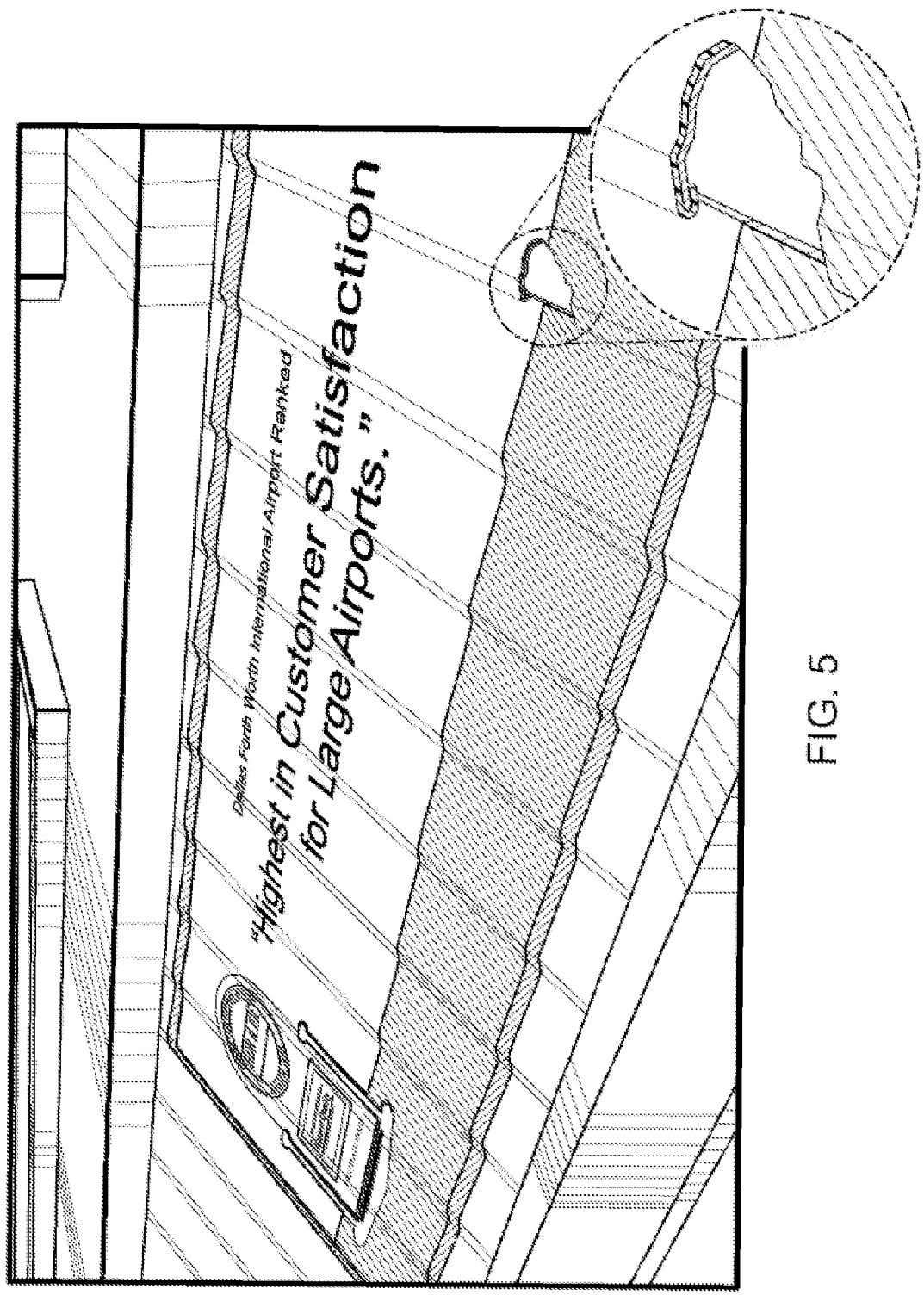
FIGS. 5-6 contain pictures of examples of some embodiments of an advertising system.
Figure 6:
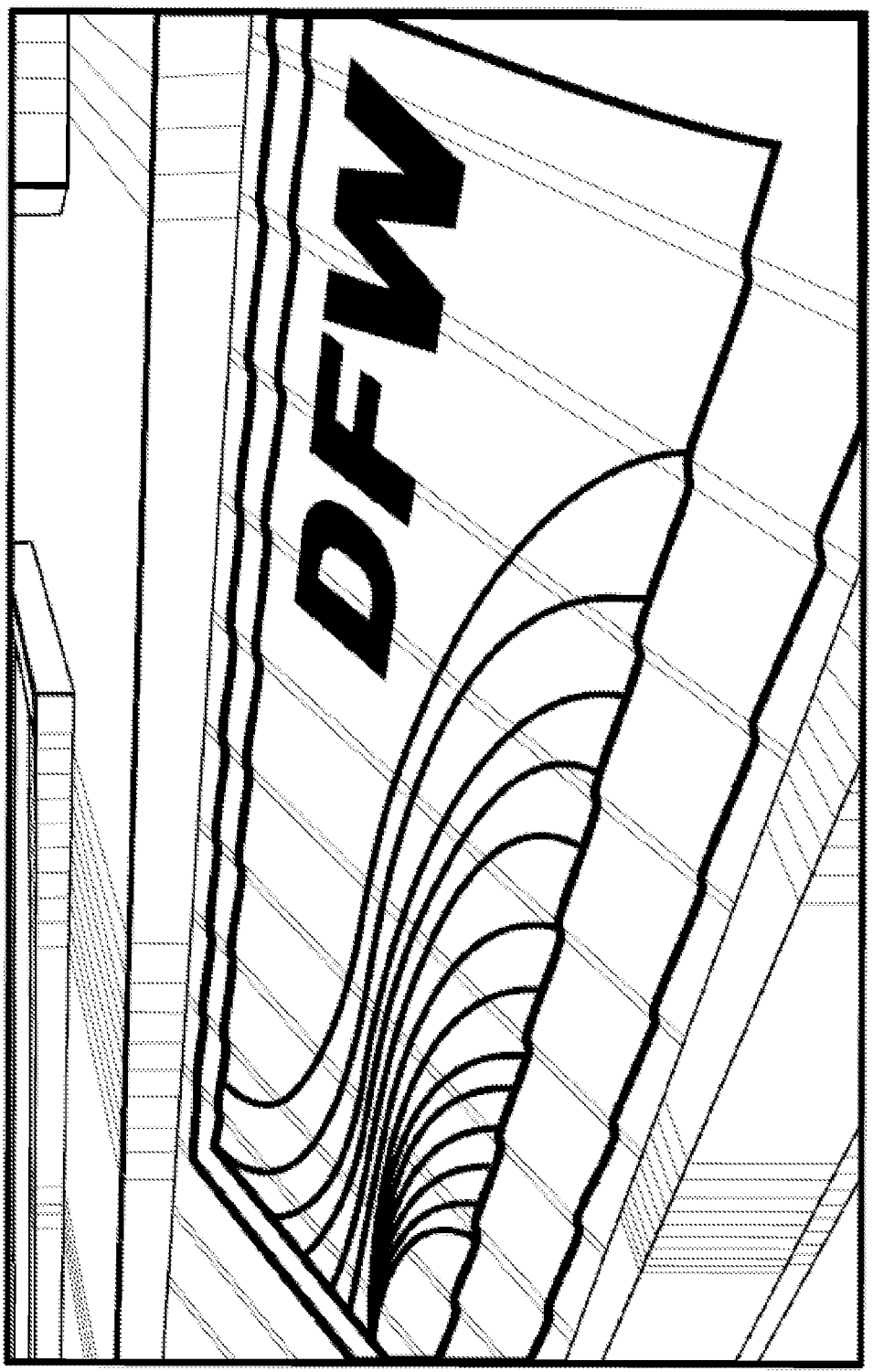

Other embodiments of the advertising systems are illustrated in FIGS. 5-6. In these Figures, the advertising system has been placed on the articulating plates so that the advertising system wraps around at least one edge of the articulating plate of the baggage carousel. In this manner, the advertising system on the bottom of one articulating plate is located adjacent the advertising system that has been placed on the top of an adjacent articulating plate. This configuration has the advantage of preventing the articulating plate in that region from directly contacting the advertising system located on an adjacent plate. In fact, to further minimize contact and any resulting abrasion in this region, a strip of soft material, such as felt, can be placed between the two abutting surfaces of the advertising system. Indeed, in some embodiments, the advertising system can be placed on the top, bottom, and all adjacent edges of the articulating plates.

Figure 7:
FIGS. 7-8 contain pictures of additional examples of some embodiments of an advertising system.
Figure 8:

Other embodiments of the advertising systems are illustrated in FIGS. 7-8. FIG. 7 illustrates a baggage carousel with an advertising system placed thereon. FIG. 8 illustrates the same baggage carousel in operation with baggage located on the advertising system.

These advertising systems can be used with any number of previously unexploited or under-exploited advertising spaces. While advertising space on non-durable surfaces has been almost entirely exploited, surfaces which are exposed to brutal and/or continuous wear have been under-utilized. For example, baggage carousels in airports have been largely free from advertising despite extended exposure to many different people. The advertising system allows for the advertising to be adhered to moving and non-moving vertical and horizontal surfaces of the baggage carousels. The advertising systems described above can be applied and removed quickly and effectively without removing, mechanically altering, or damaging the baggage carousel, reducing the downtime of such machines. Thus, the advertising system is flexible and adhesive enough to be stratified onto the moving table of a baggage carousel and durable enough to withstand the constant bump and grind of the constant motion and the sundry baggage it conveys.

The embodiments described in connection with this disclosure are intended to be illustrative only and non-limiting. The skilled artisan will recognize many diverse and varied embodiments and implementations consistent with this disclosure. Accordingly, the appended claims are not to be limited by particular details set forth in the above description, as many apparent variations thereof are possible without departing from the spirit or scope thereof.

The invention claimed is:

1. An advertising system for a baggage carousel containing multiple plates, comprising:
    indicia conveying a message or image to an individual at a baggage carousel; and
    a laminate comprising a plurality of layers including:
        a protective outer layer configured to resist abrasion; and
        an adhesive layer removably adhered to a surface of said plates;
    wherein the advertising system can be applied to and removed from the baggage carousel without removing or mechanically altering the plates of the baggage carousel and the laminate wraps around the edge of the baggage carousel plate.

2. The advertising system of claim 1, wherein the indicia is included in one of the plurality of layers.

3. The advertising system of claim 2, wherein the plurality of layers further includes an indicia layer and the indicia is included with the indicia layer.

4. The advertising system of claim 3, wherein the indicia is applied to the indicia layer by printing or silk-screening.

5. The advertising system of claim 1, wherein the protective layer is made of fluoropolymers, acrylate polymers, urethane polymers, vinyl polymers, polycarbonate thermoplastic resins, or combinations thereof.

6. The advertising system of claim 1, wherein the advertising system covers the entire exposed surface of a baggage carousel plate.

7. The advertising system of claim 1, wherein the indicia is located in or on a surface of the protective layer.

8. The advertising system of claim 1, wherein the indicia is located between the protective layer and the adhesive layer.

9. The advertising system of claim 1, wherein the advertising system further comprises multiple complimentary sections configured to be affixed to a portion of the plates such that the complimentary sections present an advertisement.

10. The advertising system of claim 9, wherein the complimentary sections are configured to provide an altered advertisement as the plates move with respect to one another.

11. A baggage carousel, comprising:
    a plurality of articulated plates; and
    an advertising system comprising:
        indicia conveying a message or image to an individual at a baggage carousel; and a laminate comprising an adhesive layer removably adhered to a surface of one of the articulate plates; and a protective outer layer configured to resist abrasion:

wherein the advertising system can be applied to and removed from the baggage carousel without removing or mechanically altering the articulated plates and the laminate wraps around the edge of an articulated plate.

12. The baggage carousel of claim 11, wherein the indicia is included in the protective layer.

13. The baggage carousel of claim 11, wherein the indicia is included within an indicia layer.

14. The baggage carousel of claim 11, wherein the advertising system covers the entire exposed surface of a baggage carousel plate.

15. The baggage carousel of claim 11, wherein the indicia is located in or on a surface of the protective layer.

16. The baggage carousel of claim 11, wherein the indicia is located between the protective layer and the adhesive layer.

17. The baggage carousel of claim 11, wherein the advertising system further comprises multiple complimentary sections configured to be affixed to a portion of the articulating plates such that the complimentary sections present an advertisement.

18. The baggage carousel of claim 17, wherein the complimentary sections are configured to provide an altered advertisement as the articulating plates move with respect to one another.

19. A method of advertising at a baggage carousel, comprising:

providing a plurality of articulated plates of a baggage carousel; and applying an advertising device to the baggage carousel without removing or mechanically altering the articulated plates and so that the advertising device wraps around the edge of a baggage carousel plate, the advertising device comprising:

indicia conveying a message or image to an individual at a baggage carousel; and a laminate comprising an adhesive layer removably adhered to a surface of one of the articulated plates; and a protective outer layer configured to resist abrasion.

20. The method of claim 19, further comprising operating the baggage carousel so that articulated plates move.

21. The method of claim 19, further comprising:

monitoring the condition of the advertising device; and replacing the advertising device depending on the excessive wear of the advertising device or the desire for a different advertising device.

22. The method of claim 19, wherein the advertising device includes a plurality of complimentary segments configured to be affixed to consecutive articulated plates of the baggage carousel so that the complimentary sections present an advertisement.

23. The method of claim 22, wherein the complimentary sections are configured to provide an altered advertisement as the articulating plates move with respect to one another.

24. The method of claim 21, wherein replacing the advertising device is performed without dismantling the articulated plates.

25. The method of claim 19, further comprising wrapping the advertising system so that is covers the entire exposed surface of a baggage carousel plate.

\* \* \* \* \*